United States Patent
Grasser

(10) Patent No.: US 8,400,713 B2
(45) Date of Patent: Mar. 19, 2013

(54) SPECKLE REDUCTION USING BEAM SPLITTING WITH BIREFRINGENT WEDGE IN LASER SCANNING DISPLAY SYSTEMS

(75) Inventor: Regis Grasser, Orleans (FR)

(73) Assignee: Texas Instruments Incorporated, Dallas, TX (US)

( * ) Notice: Subject to any disclaimer, the term of this patent is extended or adjusted under 35 U.S.C. 154(b) by 1023 days.

(21) Appl. No.: 12/181,476

(22) Filed: Jul. 29, 2008

(65) Prior Publication Data

US 2009/0034041 A1 Feb. 5, 2009

Related U.S. Application Data

(60) Provisional application No. 60/953,415, filed on Aug. 1, 2007.

(51) Int. Cl.
*G02B 27/28* (2006.01)

(52) U.S. Cl. .............. 359/489.09; 359/204.3; 353/20; 353/81

(58) Field of Classification Search .............. None
See application file for complete search history.

(56) References Cited

U.S. PATENT DOCUMENTS

| | | | |
|---|---|---|---|
| 2006/0221429 A1* | 10/2006 | Christensen et al. | 359/279 |
| 2007/0223091 A1* | 9/2007 | Lee | 359/494 |
| 2008/0049284 A1* | 2/2008 | Park et al. | 359/196 |
| 2009/0161072 A1* | 6/2009 | Yamauchi et al. | 353/20 |
| 2009/0168818 A1* | 7/2009 | Gollier et al. | 372/27 |
| 2009/0190618 A1* | 7/2009 | Kuksenkov et al. | 372/33 |
| 2010/0020288 A1* | 1/2010 | Yurlov et al. | 353/20 |
| 2010/0265466 A1* | 10/2010 | Lescure et al. | 353/20 |
| 2010/0315597 A1* | 12/2010 | Powell et al. | 353/20 |
| 2011/0211165 A1* | 9/2011 | Bauco | 353/20 |
| 2011/0317130 A1* | 12/2011 | Gollier | 353/20 |

OTHER PUBLICATIONS

Edward H. Stupp & Mathew W. Brennesholtz, Projection Displays 125-141 (John Wiley & Sons 1999).

* cited by examiner

*Primary Examiner* — Arnel C Lavarias
(74) *Attorney, Agent, or Firm* — Warren L. Franz; Wade J. Brady, III; Frederick J. Telecky, Jr.

(57) ABSTRACT

Speckle effect in scanning display systems that employs polarized phase-coherent light is reduced by depolarizing the phase-coherent light using a depolarizer and scanning the depolarized light for producing desired images.

13 Claims, 2 Drawing Sheets

SPECKLE REDUCTION USING BEAM SPLITTING WITH BIREFRINGENT WEDGE IN LASER SCANNING DISPLAY SYSTEMS

CROSS REFERENCE TO RELATED CASES

This US patent application claims priority from co-pending U.S. provisional patent application Ser. No. 60/953,415 filed Aug. 1, 2007, the subject matter of which is incorporated herein by reference in its entirety.

TECHNICAL FIELD OF THE DISCLOSURE

The technical field of this disclosure relates to the art of display systems; and more particularly to the art of display system employing phase-coherent light.

BACKGROUND OF THE DISCLOSURE

In recent years, lasers and other solid-state light sources capable of producing visible light have drawn significant attention as alternative light sources to traditional light sources for use in imaging systems such as projection systems. This attention has been due to many advantages of these light sources, such as compact size, greater durability, longer operating life, higher efficiency, and lower power consumption.

Regardless of certain superior properties over traditional light sources, solid-state light sources may produce unwanted artificial effects, one of which is speckle effect. Speckle effect arises when phase-coherent light, such as light from solid-state illuminators is scattered from a rough surface, such as a rough surface of a screen on which the images are displayed using the coherent light, and the scattered coherent light is detected by a detector having a finite aperture, such as the viewer's eyes. An image displayed on the screen appears to comprise quantized areas with sizes around the size of the detector's aperture. The intensities of the quantized areas in the displayed image often vary randomly, and such intensity variation (or fluctuation) is often referred to as the speckle effect.

In display applications using coherent light, such as light from solid-state illuminators, speckles accompanying the desired image displayed on a screen overlap with the desired image, and thus may significantly degrade the quality of the displayed image.

Therefore, elimination or reduction of the speckle effect in display applications using phase-coherent light is highly desirable.

SUMMARY

A method is provided for reducing the speckle effect in a laser scanning display system.

In a disclosed example, an input laser beam is split into first and second output laser beams having different polarization directions using an optical element in the form of a wedge. The first and second output laser beams are scanned onto a display surface to generate corresponding first and second illumination spots equal to or less than a size of an image pixel. The illumination spots are scanned at a speed so that the eye integrates the speckle effect produced by each of the different polarizations, thereby providing a reduced perceived combined speckle effect. As described in connection with the disclosed example, the optical element may be a birefingent crystal wedge with entrance and exit facets that make an angle of 3 to 5 degrees and which splits the input beam into output beams having orthogonal polarization directions and separated by an angle of 5 mrd or less. The illumination spots may be scanned at a spatial separation equal to or less than a size of an image pixel of a displayer image, with a temporal separation equal to or less than the eye integration time. Scanning may be done to cover rows and columns of a pixel array using a first scanner to scan the spots in one of an X-direction or Y-direction on a display surface and a second scanner to scan the spots in the other of the X-direction or Y-direction on the display surface.

DETAILED DESCRIPTION OF SELECTED EXAMPLES

Disclosed herein is a method of reducing speckle effect in scanning display systems that employ phase-coherent light by driving light of different polarization directions from incoming polarized light; and using the derived light for producing images in the scanning display systems. The speckle reduction method for use in scanning display systems will be discussed in the following, with particular examples, wherein the laser is used as phase-coherent light in scanning display systems. However, it will be appreciated by those skilled in the art that the following discussion is for demonstration purpose, and should not be interpreted as a limitation. Other variations within the scope of this disclosure are also applicable. For example, the method is also applicable to scanning display systems that employ other types of phase-coherent light.

Figure 1A:
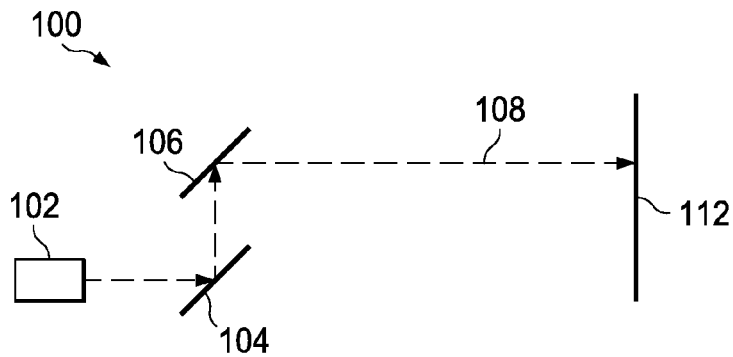
FIG. 1a through FIG. 1c schematically illustrate a typical scanning display system that employs phase-coherent light.

Referring to the drawings, FIG. 1a diagrammatically illustrates a typical laser-scanning display system 100 in the art. Laser from laser source 102 is directed to X-scanner 104 that is capable of causing the laser to move along the X direction, such as along the row of the image pixels on screen 112. The laser from X-scanner 104 is directed to Y-scanner that is capable of causing the laser to move along the Y direction, such as along the column of the image pixels on screen 112. The laser 108 from Y-scanner 106 is directed to screen 112 to scan the screen pixels for generating the desired images.

In monochromatic display application, the gray-scale levels of a displayed image on the screen can be obtained by dynamically modulating the intensity of the light scanning the screen according to the desired image to be displayed (e.g., according to the bitplane of the desired image). In color display application, light of different colors (e.g., red, green, and blue colors) are provided; and the light of each color is operated in the same way as that for the light of the single color.

Figure 1B:
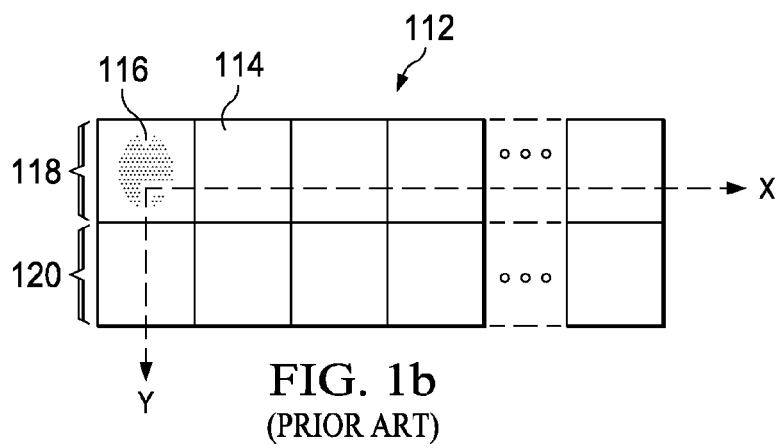

The laser scanning on the image pixels of a screen is better illustrated in FIG. 1b. Referring to FIG. 1b, screen 112 comprises an image pixel array. The image pixel rows, such as rows 118 and 120, are along the X direction; and the image pixel columns are along the Y direction. In a typical scanning operation, the laser of the displays system generates an illumination spot on screen 112; and the illumination spot has a size around that of a size of an image pixel. For example as illustrated in FIG. 1b, illumination spot 116 is caused by the laser. The illumination spot has a size around that of the size of image pixel 114.

By moving the X-scanner and maintaining the position of the Y-scanner, the illumination spot 116 is caused to move along the X direction so as to sequentially scan through the image pixels in row 118. After scanning all image pixels in a row, such as row 118, the illumination spot is moved to the next image pixel row, such as image pixel row 120 by moving the Y-scanner; while the X-scanner can be moved to a location such that the illumination spot 116 can be substantially aligned to the first image pixel of the next row (e.g., image row 120). After scanning substantially all image pixels on the screen, the desired image can be produced.

Figure 1C:
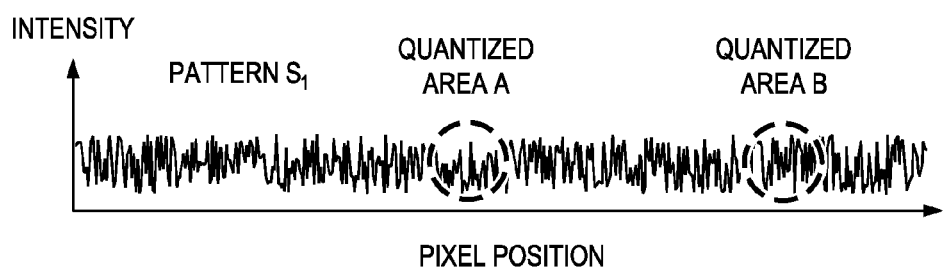

Due to the phase coherency of the laser, the image displayed on the screen 112 can be accompanied by a speckle pattern, as diagrammatically illustrated in FIG. 1c. For demonstration purposes, FIG. 1c diagrammatically illustrates an exemplary speckle pattern $S_1$ along a row of image pixels, such as row 118 in FIG. 1b, on the screen due to speckle effect. The speckle pattern comprises speckles that appear to be quantized areas with randomly varying intensities to viewers. Speckles or quantized areas, such as quantized areas A and B, of different intensities in the speckle pattern can be perceived by viewers.

The speckle effect in a scanning display system as discussed above can be reduced by depolarizing the laser beam used for producing the desired images in the display system. Specifically, laser beams of different polarization directions are produced from a single laser beam (e.g., the laser beam output from the laser source); and the produced laser beams are used simultaneously to produce the desired image.

During a scanning process, the laser beams of different polarization directions generate separate illumination spots; and the illumination spots are substantially aligned along the scanning direction, such as along the rows of the image pixels on the screen. As the illumination spots of laser beams with different polarization directions scan through the surface of the screen, each scanned diffusion point on the screen surface "sees" separate laser beams passing by with different polarization directions. Laser beams of different polarization directions interact differently with each diffusion point on the screen; and result in different and uncorrelated speckle patterns. The eyes of an observer see decorrelated speckle patterns temporarily separated by a time interval equal to or less than the eye integration time. As a consequence, the different speckle patterns are averaged out at the eye retina resulting in the speckle reduction.

In one example wherein two laser beams with substantially orthogonal polarization directions are produced from a single laser beam and the produced two laser beams have substantially the same illumination intensity, the speckle patterns perceived by viewer's eyes can be reduced by 3 db or $1/\sqrt{2}$. Specifically, the contrast ratio between the brightest area, corresponding to the area wherein the constructive interference occurs, and the darkest area, corresponding to the area wherein the destructive interference occurs, of the speckle patterns perceived by viewer's eyes (e.g., integrated by retina of the viewer's eyes) can be less than the contrast ratios of the individual speckle patterns. The speckle patterns appear to be less perceivable by viewers.

In order to maximize the speckle reduction, the difference between the polarization directions of the produced laser beams is preferably 90° degrees. In other examples, the difference can be other values, such as a value larger than 0° degree and less than 90° degrees. The speckle reduction is also maximized when the radiant flux carried by the two polarized beams are substantially equal.

Figure 2A:
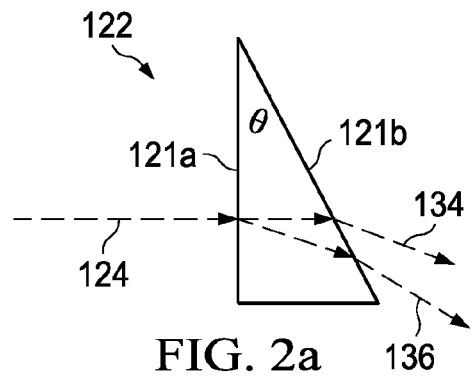
FIG. 2a through FIG. 2c schematically illustrate an exemplary scanning display system with reduced speckle effect, wherein the display system employs phase-coherent light.

The depolarization can be accomplished by using a birefringent crystal wedge, as diagrammatically illustrated in FIG. 2a. Referring to FIG. 2a, optical wedge 122 comprises an entrance facet 121a and an exiting facet 121b that is not parallel to the entrance facet. A beam of polarized light (e.g., laser beam from a laser source) enters into the optical wedge from the entrance facet 121a; and can be split into two beams 134 and 136. The two beams exit from the exiting facet 121b with different polarization directions. In one example wherein the optical axis of the optical wedge-crystal is 45° degrees from the polarization direction of incident light 124, the exiting light beams 134 and 136 can have substantially orthogonal polarization directions with substantially equal radiant flux.

The angle θ between the entrance facet 121a and the exiting facet 121b predominantly determines the angle between exiting light 134 and 136. The angle between light 134 and 136 determines the distance between the illumination spots generated by light 134 and 136 on the screen (as shown in FIG. 2c, which will be detailed afterwards), which further determines the quality of the speckle reduction. It is preferred that angle θ between the entrance facet 121a and the exiting facet 121b is equal to or less than 30° degrees, and more preferably between 5° degrees to 10° degrees and more preferably from 3° to 5° degrees so as to maximize the speckle reduction. The angle between the two exiting beams is preferably 5 mrd or less, and more preferably 1 mrd. The ideal angle between the two exiting beams is equal to the natural divergence angle of each beam. In this way, the two polarized beams can be contacted to each other but without merging into each other. If the angle between the two beams is larger than the intrinsic beam divergence, the resulting illumination spots on the screen might be too far apart to be used as a single pixel. If the angle between the two beams is smaller than the intrinsic divergence of the beams, the two illumination spots on the screen might merge into each other and the two polarizations won't have enough separation to generate the speckle reduction. The typical divergence of a flying spot laser scanner can be from 0.5 mrd to 5 mrd.

The optical wedge can be composed of a wide range of materials, such as $LiNbO_3$, quartz, $YVO_4$, Calcite, magnesium fluorides, mica, and many other suitable materials. The optical wedge can be used with other optical elements, such as an anti-reflection layer disposed on the entrance surface. The optical wedge can also be combined with other optical elements so as to form other suitable optical devices having depolarization functions, such as Wollaston prisms.

Figure 2B:
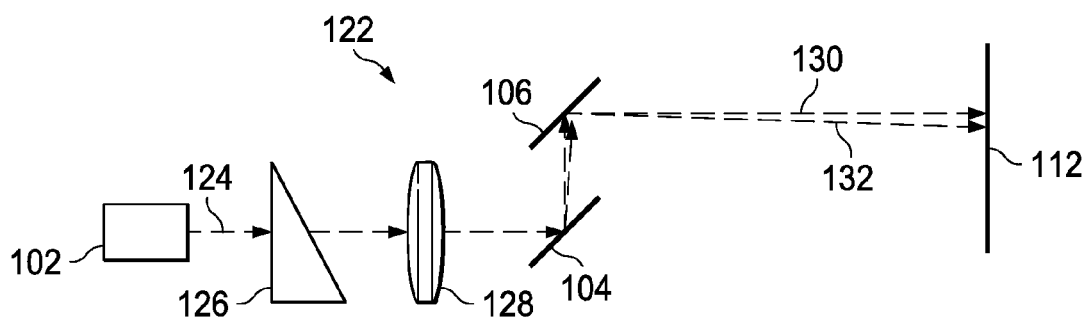
Figure 2C:
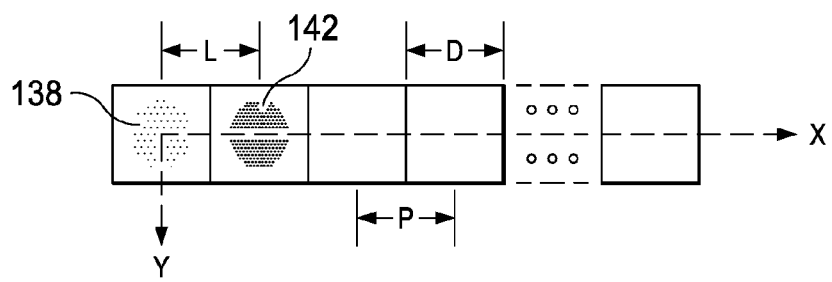

For demonstration purposes, FIG. 2b diagrammatically illustrates an exemplary scanning display system that employs a depolarization optical element. In this example, the depolarization optical element is an optical wedge as discussed above with reference to FIG. 2a. Referring to FIG. 2b, scanning display system 122 in this example comprises laser source 102, optical wedge 126, lens 128, X-scanner 104, and Y-scanner 106. Screen 112 may or may not be a member enclosed in the display system.

Light source 102 provides polarized and phase-coherent light for the display system. In one example, the light source is a solid-state laser source, such as vertical cavity surface emitting lasers (VCSEL), extended cavity surface emitting lasers (e.g. NECSEL), and many other suitable laser sources, capable of providing laser. Laser beam 124 from laser source 102 is passed through optical wedge 126 that splits incoming laser 124 into two laser beams with substantially orthogonal polarization directions. The laser beams exiting from optical wedge 126 is directed to X-scanner 104 through lens 128. X-scanner 104 in this example comprises a reflective surface by which laser beams from lens 128 are directed towards Y-scanner 106. Movement of the X-canner can be accomplished by attaching the reflective surface to a moving mechanism, such as a step motor.

The laser beams (e.g., 130 and 132) reflected from X-scanner 104 are reflected by Y-scanner 106 towards the screen (112) so as to generate the desired image. As discussed above, the gray-scale levels of image pixels can be achieved by dynamically adjusting the intensity of the light. Colors of image pixels can be achieved by scanning the screen using light beams of different colors, such as red, green, and blue colors.

In a scanning process, each of the produced laser beams (e.g., 130 and 132) generates an illumination spot at the screen; and the illumination spots are substantially aligned along the row of the image pixels on the screen as diagrammatically illustrated in FIG. 2c. Referring to FIG. 2c, illumination spots 138 and 142 are generated by laser beams 130 and 132 respectively. The distance L between the centers of the illumination spots 138 and 142 can be any suitable value. In one example, the distance L can be around the size D of an image pixel on the screen, or can be around the size of the pitch P of image pixel array on the screen, wherein the pitch is defined as the distance between the adjacent image pixels in a row of the image pixel array on the screen. For example, the distance L can be from 0.1 mm to 10 mm, such as from 1 mm to 5 mm. Each illumination spot may have a characteristic dimension around or less than the size of an image pixel on the screen. The distance L can be as small as possible without having the beams merging into each other. Because the two beams are derived from one single laser beam, the intensity modulation (for achieving the gray-scale levels of image pixels) is done by changing the power supply intensity on the laser. It is therefore preferred (though not required) that the illumination spots generated by the two laser beams on the screen are as close as possible in order to remain within one single image pixel.

The size of each illumination spot and/or the distance between the centers of the illumination spots can be controlled by optical lens 128. Specifically, by adjusting one or both of the focal length and the relative position of lens 128 between optical wedge 126 and X-scanner 104, sizes of the illumination spots and/or the distance between the centers of the illumination spots 138 and 142 (in FIG. 2c) can be adjusted for optimal speckle reduction.

The illumination spots (138 and 142 as illustrated in FIG. 2c) are caused to move along the row of the image pixels (e.g., along the X direction) by moving the X-scanner 104 (as illustrated in FIG. 2b) while maintaining the position of the Y-scanner 106. Because the laser beams (130 and 132 as illustrated in FIG. 2c) generating the illumination spots 138 and 142 have different polarization directions, such as orthogonal polarization directions, each diffusion point on the screen causes separate and uncorrelated speckle patterns as the illumination spots pass by. When the viewer views the image displayed on the screen, the viewer's eyes integrate the separate speckle patterns; and the integrated speckle patterns in the viewer's eyes appear to have less contrast as compared to individual speckle patterns. As a consequence, the integrated speckle patterns in the viewer's eyes appear less perceivable than either one of the individual speckle patterns.

After scanning across the entire row of the image pixels on the screen, the illumination spots are moved to the next row for scanning the image pixels on the next row. This movement can be accomplished by moving the Y-scanner for aligning the illumination spots to the next row of image pixels on the screen; and moving the X-scanner for aligning one of the two illumination spots to the starting image pixel (e.g., the leftmost image pixel) of the next row. The above scanning process continues until substantially all image pixels on the screen are scanned.

It is noted that the scanning display system as discussed above with reference to FIG. 2b is only one of many possible scanning display systems in which examples of the speckle reduction method of this disclosure can be implemented. Scanning display systems with other configurations are also applicable. For example, the X-scanner 104 and the Y-scanner 106 in FIG. 2b can be exchanged. Specifically, the Y-scanner 106 can be disposed between the X-scanner 104 and light source 102 on the optical path of the scanning display system. The scanning display system may comprise other suitable optical elements, such as a field lens, a relay lens, and a projection lens.

It will be appreciated by those of skill in the art that a new and useful method for speckle reduction and an optical system capable of speckle reduction have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

I claim:

1. A method for reducing speckle effect in a laser scanning display system, the method comprising:
providing a first laser beam;
deriving second and third laser beams from the first laser beam, comprising passing the first laser beam through a birefringent crystal wedge, such that the second and the third laser beams have different polarization directions; and
scanning a display target by the second and the third laser beams so as to generate an image from corresponding first and second illumination spots of different polarizations and different speckle effects on the display target scanned at a time interval separation equal to or less than an eye integration time so as to provide a perceived speckle effect which is less than a perceived speckle effect producible by either of the different speckle effects alone.

2. The method of claim 1, wherein the second laser beam has a polarization direction that is substantially perpendicular to a polarization direction of the third laser beam.

3. The method of claim 2, wherein the step of scanning the display target comprises:
generating an illumination spot on the display target by the second laser beam; and
generating another illumination spot on the display target by the third laser beam, wherein a center-to-center distance between the two illumination spots is equal to or less than a size of an image pixel on the display target.

4. The method of claim 3, further comprising changing an intensity of the second and the third laser beams by changing an intensity of the first laser beam according to a gray-scale level of an image pixel in an image to be displayed.

5. The method of claim 4, wherein the step of scanning further comprises:

directing the second and third laser beams towards a first scanner that causes the second and third laser beams to move along a first direction on the display target; and directing the second and third laser beams towards a second scanner that causes the second and third laser beams to move along a second direction on the display target.

6. The method of claim 5, wherein the first direction is along a row or a column of an array of image pixels on the display target; and the second direction is along a column or a row of the array of image pixels on the display target.

7. The method of claim 6, wherein the second and third laser beams are separated by an angle of 5 mrd or less.

8. The method of claim 7, wherein the center-to-center distance is substantially equal to the size of an image pixel on the display target.

9. The method of claim 8, wherein the two illumination spots are substantially aligned along the row of the array of image pixels on the display target.

10. The method of claim 9, wherein the wedge comprises an entrance facet into which the first laser beam enters into the wedge; and an exit facet from which the second and third laser beams exit from the wedge; and wherein the entrance and the exit facets make an angle that is from 3 to 5 degrees.

11. The method of claim 2, wherein the second and third laser beams are separated by an angle of 5 mrd or less.

12. The method of claim 2, wherein the two illumination spots are substantially aligned along a row of an array of image pixels on the display target.

13. The method of claim 1, further comprising adjusting an intensity of the first laser beam according to a gray-scale level of an image pixel in an image to be displayed.

* * * * *